No. 704,238. Patented July 8, 1902.
A. W. COOKSEY.
PIPE OR CONDUIT.
(Application filed Jan. 14, 1902.)
(No Model.) 2 Sheets—Sheet 1.
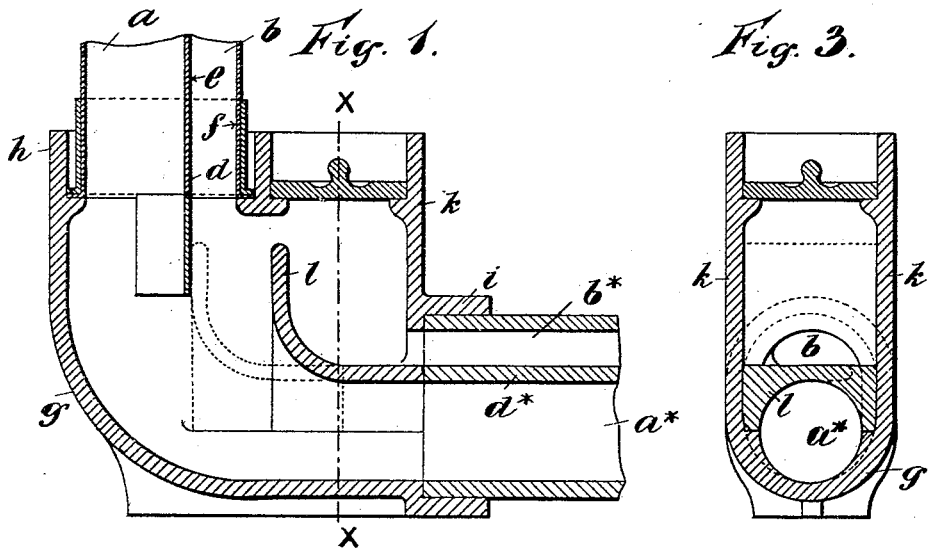
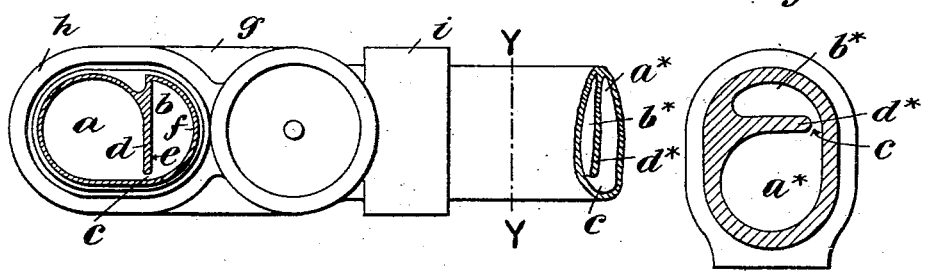

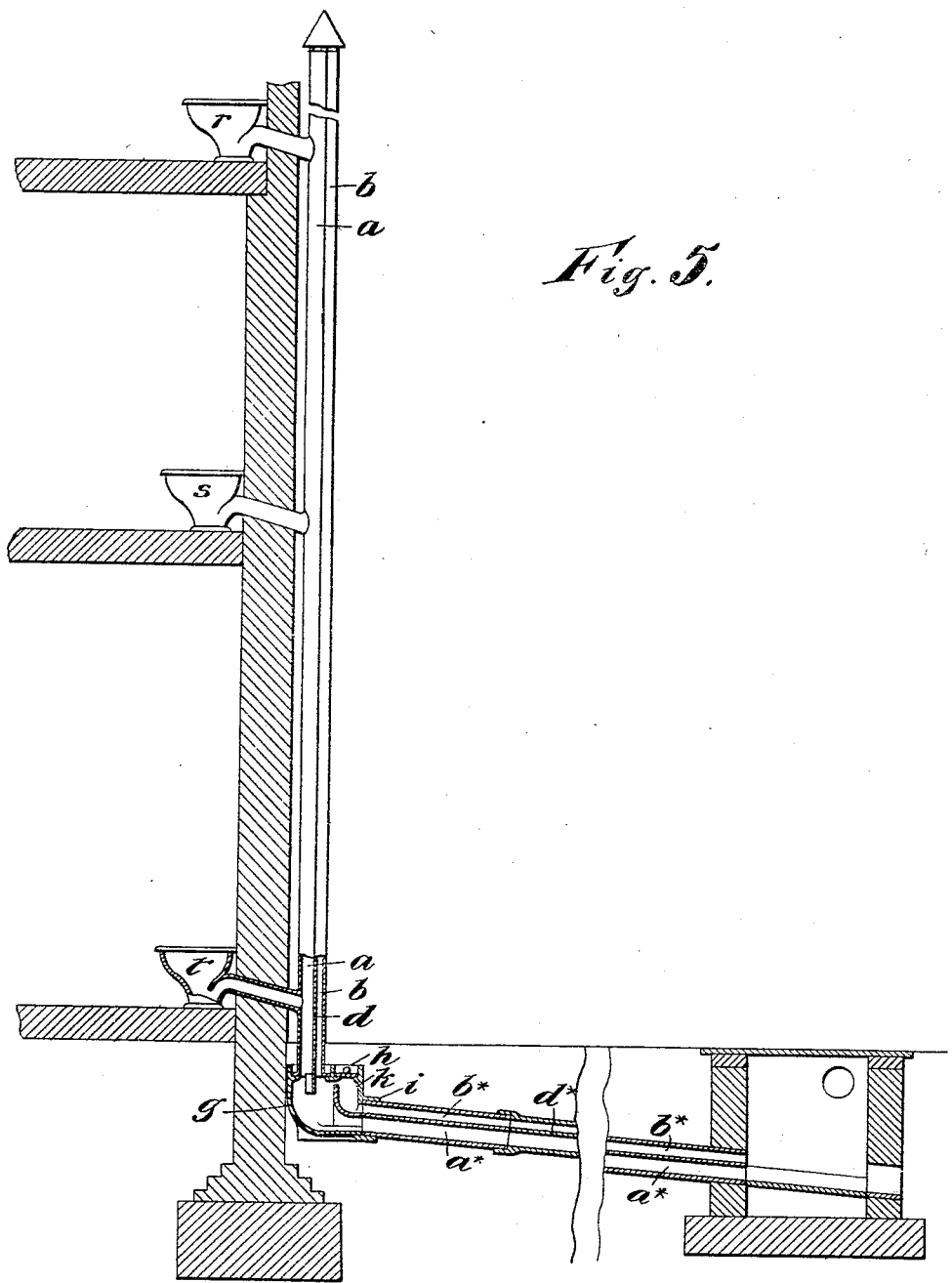

UNITED STATES PATENT OFFICE.

ARTHUR WILLIAM COOKSEY, OF LONDON, ENGLAND.

PIPE OR CONDUIT.

SPECIFICATION forming part of Letters Patent No. 704,238, dated July 8, 1902.

Application filed January 14, 1902. Serial No. 89,750. (No model.)

*To all whom it may concern:*

Be it known that I, ARTHUR WILLIAM COOKSEY, A. R. I. B. A., a subject of the King of Great Britain, residing at London, England, have invented certain new and useful Improvements in Pipes or Conduits; and I do hereby declare the following to be a full, clear, and exact description of the invention, such as will enable others skilled in the art to which it appertains to make and use the same.

The improvements which form the subject of the present invention relate more especially to soil or water pipes for connecting one or more water-closets with the drain or sewer, and has for its object the preventing of siphoning—that is to say, the destruction of the water seal in the trap or traps of one or a number of closets by the rush of water in the soil or water pipe caused by the flushing operation, and this, if desired, without the use of separate antisiphoning-pipes, as heretofore employed; and in order that the said invention may be fully understood I will now proceed to describe the same with the aid of the accompanying sheet of drawings, in which—

Figure 1 is a longitudinal section of the lower end of a vertical soil or water pipe with a bend or elbow connection to the more or less horizontal drain-pipe leading to the sewer, the vertical and horizontal pipes being constructed in accordance with my invention; Fig. 2, a corresponding plan, partly in section; Figs. 3 and 4, transverse sections taken on lines X X and Y Y, respectively, of Figs. 1 and 2; and Fig. 5, a diagrammatic sectional view illustrating the application of this invention to three water-closets of a building.

Similar letters of reference relate to like parts in all the figures of the drawings.

According to this invention the pipe is made of a soil or water duct $a$, having a separate air-compartment $b$ communicating with it by means of a narrow aperture $c$ only, preferably extending from end to end of the pipe. The general shape of the pipe may be more or less cylindrical, as usual; but it may be of an oval shape, as shown in Fig. 2, the soil or water duct $a$ therein being preferably more or less cylindrical, as shown.

$d$ is a leaf or partition projecting from one side of the internal surface of the pipe and extending more or less across to the other side thereof and either connected thereto at intervals or leaving the aperture $c$ open from end to end of the pipe. This leaf or partition $d$ serves to separate the soil or water duct $a$ from the air-compartment $b$, and the said soil or water duct $a$ being itself of sufficient area to conduct the soil and flushing-water to the drain or sewer a free passage for air is reserved between the back $e$ of the leaf or partition $d$ and the internal surface $f$ of the pipe, whereby any tendency to siphon the water out of the traps of the closets when any one of said closets is flushed is effectually obviated.

Lengths of pipe constructed according to this invention may be jointed together in the usual way, as it is not absolutely essential that a perfect joint should be made between the ends of the leaf or partition $d$ in two adjacent pipes; but, if desired, a short connecting-sleeve of approximately the same section as the lengths of pipe to be connected together may be inserted a short distance into the enlarged adjacent ends of two lengths of pipe and the joint be made outside of such connecting-sleeve.

The vertical pipe $a\,b$ (shown in Figs. 1, 2, and 5) is supposed to be made of lead, iron, or other suitable metal; but it is obvious that such pipes may be made of any other suitable material—for example, of clay, like ordinary drain-pipes, as illustrated in Figs. 1, 2, and 4, where $a^*$ and $b^*$ represent, respectively, the soil or water duct and air-compartment, corresponding to $a$ and $b$ of the vertical pipe above described, and $d^*$ the leaf or partition. The pipe $a^*\,b^*$ is shown horizontal and represents part of a drain-pipe constructed in accordance with the invention. The vertical pipe $a\,b$ and horizontal pipe $a^*\,b^*$ may be connected together by a bend or elbow $g$, made of clay, cast-iron, or other suitable material, provided with sockets $h$ and $i$ to receive the ends of the said pipes, as shown. To facilitate the cleaning out of the air-compartment $b^*$ and soil or water duct $a^*$, the inspection-chamber $k$ may be provided, and the part $l$, which forms a shield to prevent soil and water passing direct from the vertical duct $a$ into the horizontal air-compartment $b^*$, may be made removable, as shown in Figs.

1 and 3. The leaf or partition $d$ of the vertical pipe may be prolonged downward somewhat into the connecting bend or elbow $g$ in order to guide the soil and water well into the duct $a^*$ of the horizontal pipe.

On reference to Fig. 5 it will be understood that when the closet $r$ is flushed or even when the closets $r$ and $s$ are flushed simultaneously there will be no danger of the seal in the trap of the closet $t$ being broken by the sudden downrush of water in the pipes $a$ or $a$, because the more or less continuous connection between the water-duct $a\ a$ and the air-compartment $b\ b$ overcomes any tendency to form a vacuum.

It is obvious that this invention may be applied to pipes or conduits other than soil or water pipes and that the sections of such pipes or conduits and the form and position of the separating leaf or partition may be varied according to circumstances.

Pipes made in accordance with this invention are less liable than ordinary pipes to be damaged by frost not only because the air-compartment acts more or less as a non-conductor, but also because the elasticity of the air contained in that compartment compensates for the expansion of the water in the soil or water duct at the time of freezing.

I claim—

1. A pipe or conduit having a leaf or partition projecting from one side of its internal surface and extending partly across to the other side thereof, substantially as and for the purposes set forth.

2. A pipe or conduit divided into two compartments connected together by a longitudinal aperture in the dividing leaf or partition, one compartment forming a duct for the passage of liquid or other substances and the other an air-compartment for receiving the air escaping from the said duct through the said aperture, substantially as and for the purposes set forth.

In witness whereof I have hereunto set my hand in presence of two witnesses.

ARTHUR WILLIAM COOKSEY.

Witnesses:
STEPHEN EDWARD GUNYON,
WILLIAM ANDERSON SMITH.